July 27, 1937.  F. W. WATSON  2,088,100
HATCH COVER FASTENER
Filed Sept. 4, 1936
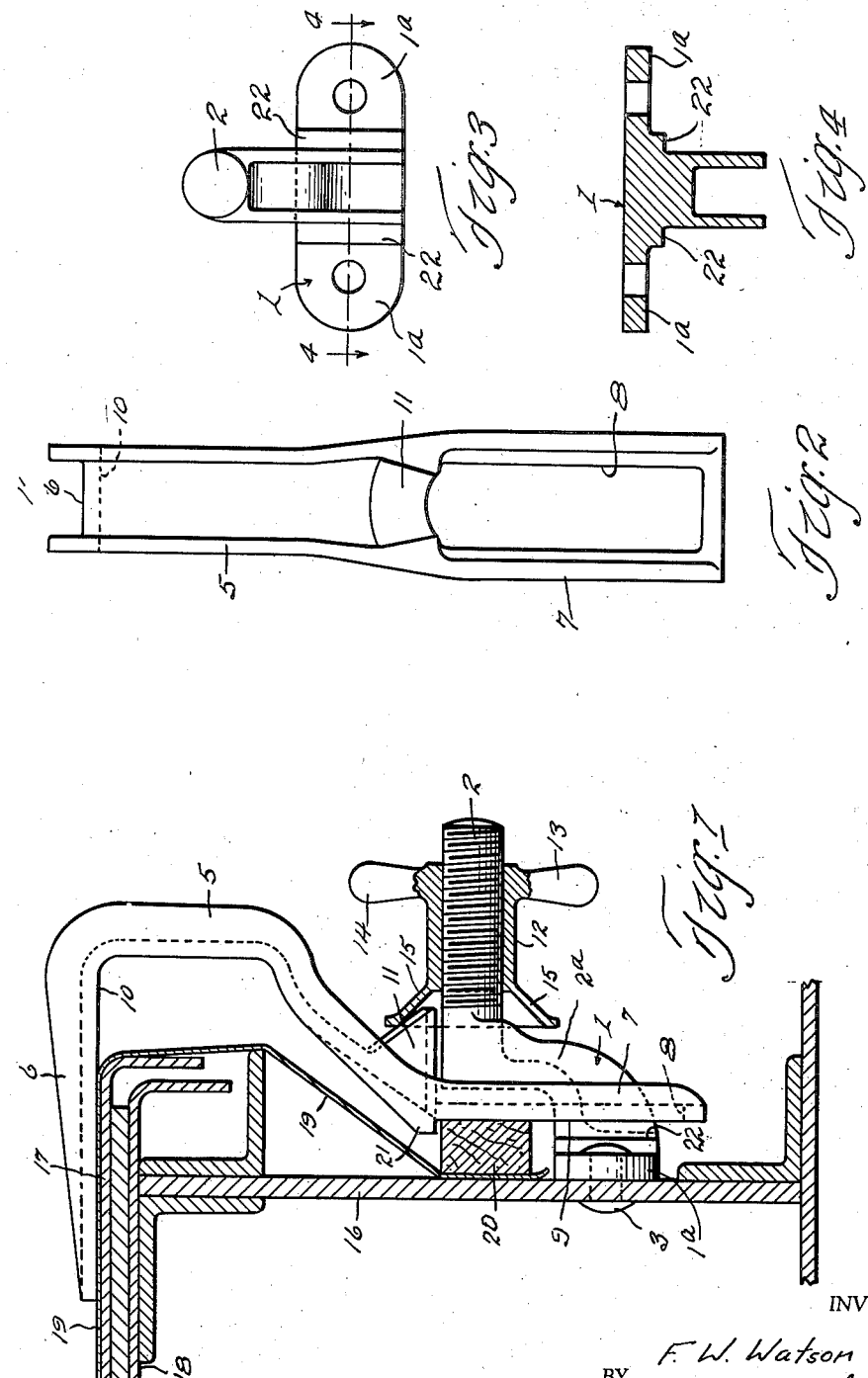
INVENTOR.
F. W. Watson
BY
ATTORNEY.

Patented July 27, 1937

2,088,100

UNITED STATES PATENT OFFICE 2,088,100

HATCH COVER FASTENER

Frederick W. Watson, Cleveland, Ohio

Application September 4, 1936, Serial No. 99,454

3 Claims. (Cl. 114—203)

This invention relates to hatch cover fasteners for fastening the hatches and hatch covers upon vessels or ships. One of the objects of the invention is to provide a hatch cover fastener which comprises few parts, is simple in construction and which at the same time will effectively secure the hatch covers in place and be adapted for production at comparatively low cost.

A further object of the invention is to provide a hatch cover clamp which is so shaped and designed and in which the securing means is so disposed and arranged as to prevent tipping of the clamps either during application or as a result of movement of the ship in stormy weather.

Another object of the invention is to provide a hatch cover clamp which consists of a bracket having an offset portion and a threaded stud portion together with a clamping member fitting over the bracket and having a nose portion adapted for engagement with the hatch cover, the offset portion of the bracket serving to permit the batten strip to be disposed immediately under the securing means and in which the pressure is applied to the clamp between the batten strip and the nose portion of the clamp whereby to prevent tipping of the clamp.

Further and more limited objects of the invention will appear as the description proceeds and by reference to the accompanying drawing in which Fig. 1 is a vertical sectional view taken through a hatch coaming and showing the cover and clamp in place; Fig. 2 is a rear elevation of the removable clamp element; Fig. 3 is a similar view of the clamp bracket; and Fig. 4 a sectional view taken on the line 4—4 of Fig. 3.

In my prior Patent No. 1,413,081 which issued April 18, 1922 there is disclosed a hatch clamp cover which consists essentially of a bracket over which is secured a clamp, the nose portion of which engages the cover and the tail portion of which is provided with a stud or screw which prevents tipping of the clamp as it is moved into place. The improved clamp herein disclosed eliminates the necessity for the stud or screw shown in my prior patent.

Referring now to the drawing, my improved clamp consists essentially of a bracket 1 having a threaded stud portion 2, a downwardly extending shank portion 2a and a flanged base portion 1a at the bottom of said shank portion and offset therefrom to provide a space thereabove and between the same and the downwardly extending shank portion for the reception of a batten. The bracket is secured to the hatch coaming by means of a pair of rivets 3 extending through the flanged base portion 1a. Fitting over the bracket is a clamp 5 having a nose portion 6 which is adapted to engage the hatch cover or overcover and a tail portion 7 having a rectangular slot 8 therein. The clamp fits over the bracket in the position shown in Fig. 1 and has a vertically disposed face 9 and a horizontally disposed face 10 which is disposed at right angles to the face 9. Formed integral with the clamp is an inclined lug 11 the purpose of which will hereinafter appear. Threadedly secured on the stud 2 is a nut 12 having thereon a pair of handles 13 and 14 and which is also provided with an outwardly flaring flange portion 15.

In Fig. 1 the hatch cover clamp is shown as it will appear when secured in place on a hatch. The reference character 16 denotes the hatch coaming to which the bracket is secured. The reference characters 17 and 18 indicate two sections of the hatch cover proper and over which is disposed the tarpaulin overcover 19. Disposed over the lower edge of the tarpaulin overcover is the batten strip 20 which is positioned beneath the threaded stud portion of the bracket. To secure the hatch cover fastener in place, the clamp is positioned over the bracket with the nose of the clamp in engagement with the tarpaulin overcover. The nut 12 is then applied and tightened to move the flange portion 15 thereof into contact with the inclined lug 11 which movement causes the clamp to be moved inwardly and downwardly. It will be seen that force is applied to the clamp between the batten strip and the nose of the clamp and that the batten strip is disposed almost immediately beneath the threaded stud so that there is no tendency of the clamp to tip as it is being secured in place. Such a construction also prevents the clamp from slipping off or tipping due to the twisting or rolling movement of the ship in rough weather. The clamp is also provided with an integral lug or projection 21 which is disposed immediately over the batten strip and which serves to prevent the batten strip from slipping upwardly.

It will be observed that the clamp bracket is provided with a shoulder 22 located on each side of the lower portion of the shank thereof and adjacent to the flanged base 1a by which the said bracket is riveted to the hatch coaming. These shoulders are so located that, when the battens 20 are employed, the tail portions of the clamping members will not engage the same. However, when the cargoes which are carried or the weather conditions are such as to make the use of tarpaulins and battens unnecessary, the clamping members will be moved inwardly or toward the hatch coamings until the tail portions thereof engage the shoulders, thus forming a secure anchorage for the clamping members while enabling them to operate with the same efficiency in holding the covers in place as where the tarpaulins and battens are employed.

It will now be clear that I have provided an improved hatch cover clamp which will accomplish the objects of the invention as hereinbefore stated. I wish it to be understood that the embodiment of the invention herein disclosed is to be considered merely as illustrative and not in a limiting sense as various changes may be made in the details of construction and arrangement of parts without departing from the spirit of my invention and the invention is limited only in accordance with the scope of the appended claims.

Having thus described my invention, what I claim is:

1. In a hatch fastener, the combination of a bracket comprising a threaded stud portion, a downwardly extending shank portion, and a base portion at the bottom of said shank portion and offset therefrom to provide a space thereabove and between the same and the downwardly extending shank portion for the reception of a batten; a clamping member comprising a nose portion adapted to engage the cover of a hatchway, a downwardly extending slotted portion adapted to receive therewithin said shank portion, and an outwardly inclined lug above the slotted portion and above the stud portion; a nut threaded upon the stud portion and having a flange adapted to engage said lug above the batten-receiving space; and a batten within said space and below said lug.

2. In the hatch fastener recited in claim 1, the clamping member being provided with a shoulder opposed to said lug and above the said stud portion thereby to prevent movement upwardly above said shoulder of the batten within the batten-receiving space.

3. In the hatch fastener recited in claim 1, the shank portion of the bracket having a shoulder projecting outwardly from each side of the base portion thereof adapted to engage the lower portion of the clamping member when the batten-receiving space is unoccupied by the batten.

FREDERICK W. WATSON.